US006981275B1

(12) United States Patent
Maeda et al.

(10) Patent No.: US 6,981,275 B1
(45) Date of Patent: Dec. 27, 2005

(54) TELEVISION RECEIVER

(75) Inventors: Satoru Maeda, Kanagawa (JP); Nobutaka Tani, Saitama (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/449,976

(22) Filed: Nov. 26, 1999

(30) Foreign Application Priority Data

Nov. 30, 1998 (JP) ............................... P10-340710

(51) Int. Cl.$^7$ ................................................ H04N 7/16

(52) U.S. Cl. ....................... 725/139; 725/110; 725/131

(58) Field of Search .......................... 725/109–113, 37, 725/105, 131–134, 151–153, 139–142; 348/563–570

(56) References Cited

U.S. PATENT DOCUMENTS 5,896,444 A * 4/1999 Perlman et al. .......... 379/93.35
5,905,777 A * 5/1999 Foladare et al. ......... 379/90.01
5,912,697 A * 6/1999 Hashimoto et al. ......... 725/114
5,991,799 A * 11/1999 Yen et al. ................... 709/218
5,999,970 A * 12/1999 Krisbergh et al. .......... 725/109
6,052,442 A * 4/2000 Cooper et al. ........... 379/88.19
6,209,025 B1 * 3/2001 Bellamy ..................... 709/217
6,282,435 B1 * 8/2001 Wagner et al. .............. 455/566
6,301,619 B1 * 10/2001 Segman ...................... 709/231
6,308,329 B1 * 10/2001 Takahashi ................... 725/153
6,388,714 B1 * 5/2002 Schein et al. ............... 348/563
6,483,905 B1 * 11/2002 Kikinis .................... 379/93.24
6,536,041 B1 * 3/2003 Knudson et al. .............. 725/39
6,634,028 B2 * 10/2003 Handelman ................. 725/116
6,636,890 B1 * 10/2003 Mandalia .................... 709/206
6,859,937 B1 * 2/2005 Narayan et al. .............. 725/37
2004/0103167 A1 * 5/2004 Grooters et al. ............ 709/217
2004/0103439 A1 * 5/2004 Macrae et al. ............. 725/109

* cited by examiner

*Primary Examiner*—John Miller
*Assistant Examiner*—Scott Beliveau
(74) *Attorney, Agent, or Firm*—Jay H. Maioli

(57) ABSTRACT

A television receiver in which a summary of an electronic mail can be displayed along with a television picture. A central processing unit (CPU) receives an electronic mail by an electronic mail function via a modem 4 adapted for connection to an external mail server and extracts the summary of the electronic mail by a summary extraction function to write the electronic mail summary in a display memory 7. The CPU 1 causes the summary of the electronic mail to be superimposed on the television picture by a superimposing function of a television receiving unit 6 to display the electronic mail summary along with the television picture.

3 Claims, 4 Drawing Sheets

9

Sender N.Subject N

TELEVISION RECEIVER

BACKGROUND OF THE INVENTION

1. Field of the Invention

This invention relates to a television receiver having an electronic mail function.

2. Description of the Related Art

Recently, the electronic mail exchanging messages over a communication network is becoming popular. The electronic mail system operates on workstations or personal computers distributed over the network.

Also, as the functions built into a television receiver for household use become sophisticated, a television receiver having the function of receiving the teletext, or the interactive communication function, or a television receiver having the function of electronic mail transmission/reception, is becoming popular.

Meanwhile, in a television receiver having the electronic mail function, access to the electronic mail is had as an entire image of the electronic mail is displayed on the screen, so that both the television picture and the electronic mail cannot be seen simultaneously. Moreover, if desired to check the contents of the electronic mail as the viewer is seeing the television picture, it is necessary for the viewer to switch to the electronic mail picture. Thus, if plural viewers are seeing the television picture simultaneously, and one of them accesses to the electronic mail, the screen is switched to the electronic mail picture, so that the other viewers cannot see the television picture.

SUMMARY OF THE INVENTION

It is therefore an object of the present invention to provide a television receiver whereby summary of the electronic mail can be displayed along with the television picture.

In one aspect, the present invention provides a television receiver including a connection interface for connection to an external mail server, electronic mail means having an electronic mail function of exchanging electronic mails via the connection interface, display means for displaying a television picture, summary extraction means for extracting the summary of an electronic mail received by the electronic mail means, superimposing means for superimposing the summary of the electronic mail received by the electronic mail means on a television picture for displaying the electronic mail summary on the display means along with the television picture, and control means for controlling the operation of at least the electronic mail means and the superimposing means.

The control means performs control of accepting an electronic mail check command to receive the electronic mail by the electronic mail means to display the summary along with the television picture on the display means. The control means causes the electronic mail means to receive a new electronic mail by the electronic mail means automatically to display the summary thereof along with the television picture on the display means. The control means controls the operation of the superimposing means so that the summary of an electronic mail extracted by the summary extraction means will be scroll-displayed on the display means. The control means accepts a command for displaying the electronic mail on an entire screen of the display means to control the operation of the superimposing means so that the electronic mail received by the electronic mail means will be displayed on the entire screen of the display means.

Thus, with the television receiver according to the present invention, an electronic mail is received by an electronic mail function of exchanging electronic mails via a connection interface adapted for connection to an external mail server, and the summary of the electronic mail is extracted by the summary extraction means and superimposed by superimposing means on a television picture to display the electronic mail summary along with the television picture.

DESCRIPTION OF THE PREFERRED EMBODIMENTS

Figure 1:
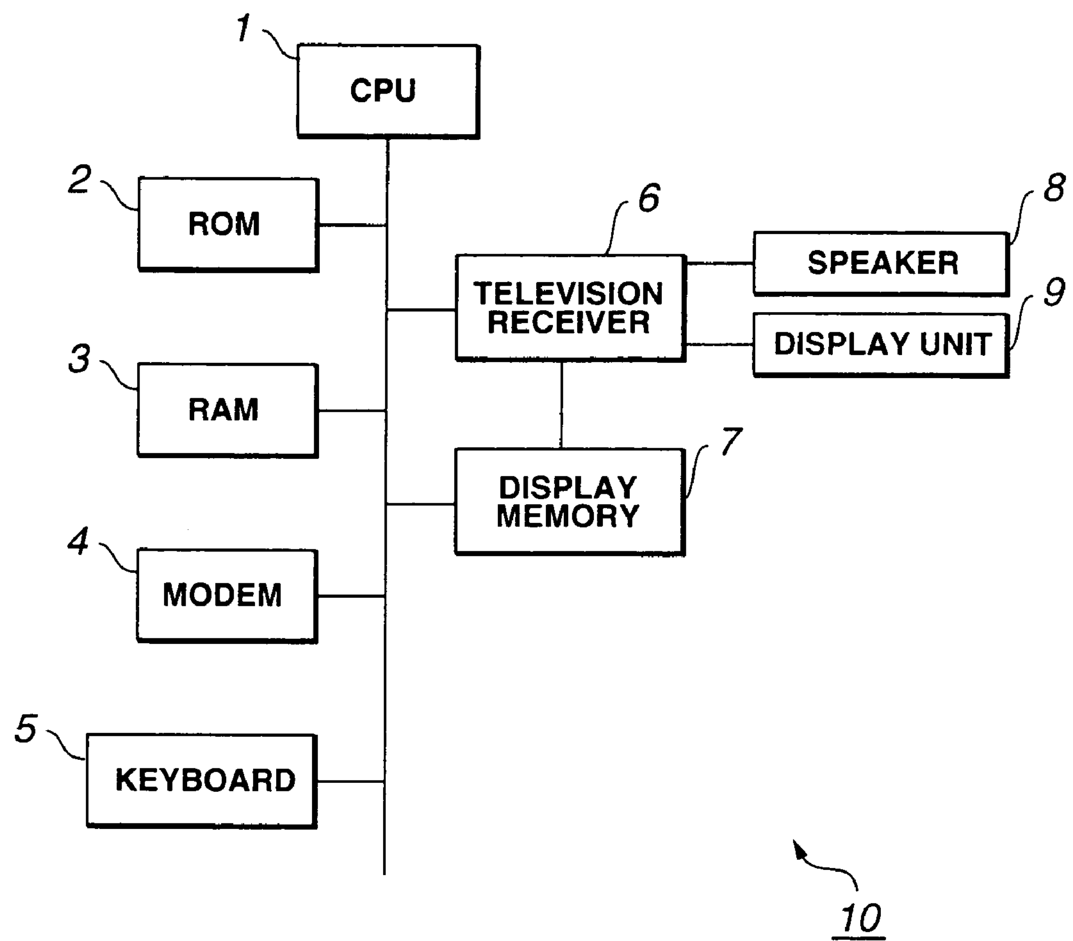
FIG. 1 is a block diagram showing the schematic structure of a television receiver embodying the present invention.

Referring to the drawings, preferred embodiments of the present invention will be explained in detail.

The present invention is applied to a television receiver configured as shown in FIG. 1. This television receiver 10 includes read-only memory (ROM) 2, a random access memory (RAM) 3, a modem 4, a keyboard 5, a television receiving unit 6, a display memory 7, connected over a bus to a central processing unit (CPU) 1, a speaker 8 and a display unit 9, both connected to the television receiving unit 6.

The CPU 1 controls the entire system as a system controller of the television receiver 10 and operates in accordance with the control program stored in the ROM 2. This CPU 1 uses the RAM 3 as a work memory. This CPU 1 has the function of an electronic mail of transmitting and receiving electronic mail data via modem 4, and the summary extracting function of extracting the summary of the electronic mail.

The keyboard 5 is used for inputting a control command to the CPU 1 over a bus and is actuated by the user.

The television receiving unit 6 receives and decodes television signals. The sound of the television signals, decoded by this television receiving unit 6, is outputted from the speaker 8, whilst a television picture is displayed on a screeen of the display unit 9.

The television receiving unit 6 includes a tuner circuit and a synchronization signal generating circuit. The television receiving unit 6 further has a circuit for reading out display data from the display memory 7 to superimpose the read-out display data at a pre-determined position of a television screen by scroll display or to display the read-out picture data as the latter is overlapped on the television picture.

The display memory 7 stores the data for display and is able to write or read data on accessing from the CPU 1 and to read out data from the display circuit of the television receiving unit 6.

Figure 2:
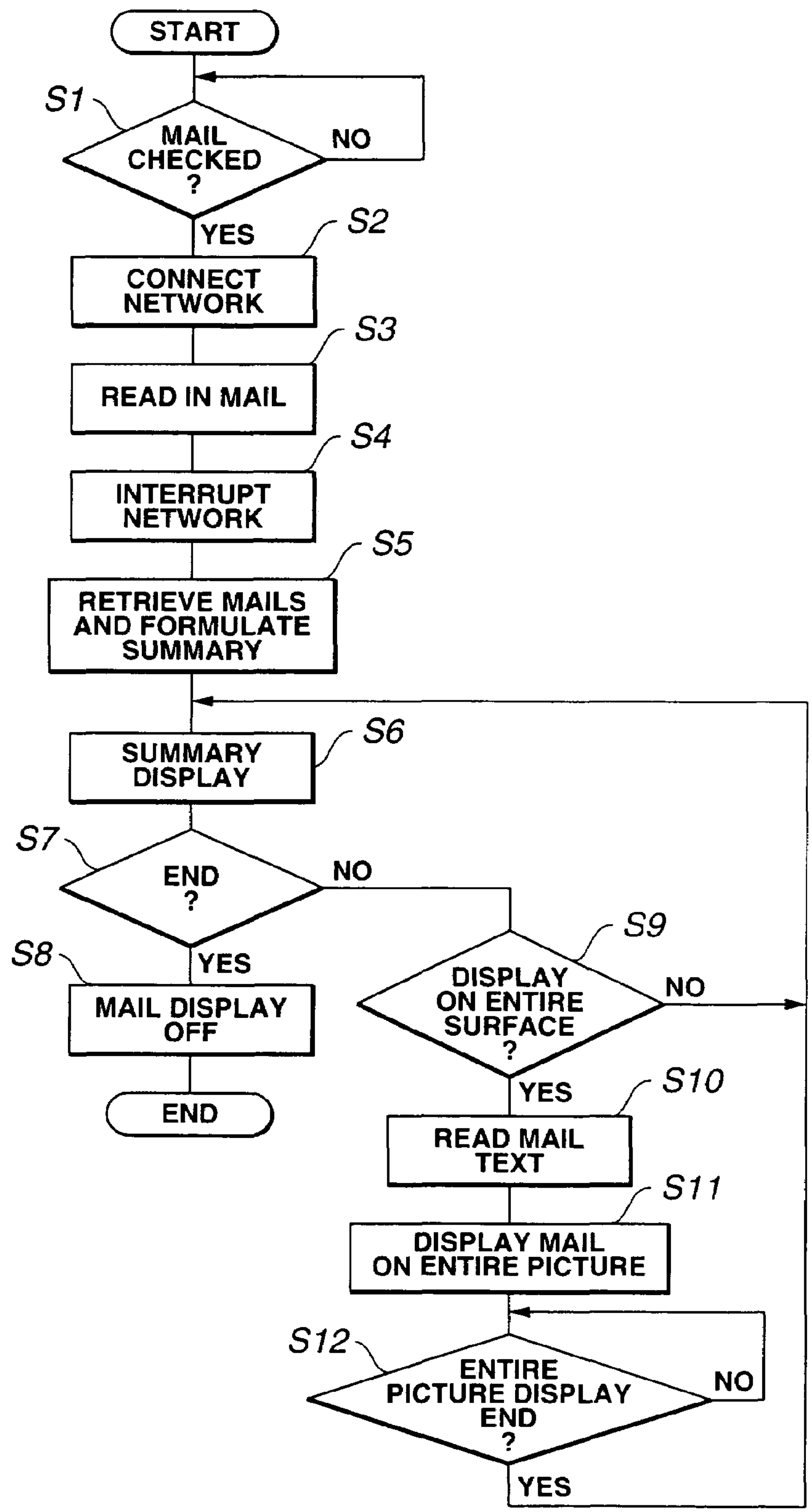
FIG. 2 is a flowchart showing the operational sequence of electronic mail display on the television receiver of FIG. 1.

In the above-described television receiver 10, the CPU 1 performs the following electronic mail display control by the control program stored in the ROM 2 in accordance with the flowchart shown in FIG. 2.

That is, the CPU 1 determines, at step S1, whether or not an electronic mail check command has been entered by a keyboard 5. If the result of decision at this step S1 is NO, that is if the electronic mail check command has not been entered, this step S1 is repeated. If the result of decision at this step S1 is YES, that is if the electronic mail check command has been entered, the CPU 1 advances to step S2.

At step S2, a dial command to a access point for connection to the mail server is issued to the modem 4. Dialled transmission is performed in accordance with this dialled transmission command to connect the modem 4 to the access point. This connects the CPU 1 to the modem on the mail server side.

At the next step S3, entire mail data addressed to the CPU 1 from the mail server is read out and written in the Working RAM 3. After writing the mail data addressed to the CPU 1 in its entirety in the Working RAM 3, the CPU 1 advances to step S4.

At step S4, the CPU 1 commands network interruption to the modem 4 to release the network.

At the next step S5, the working RAM 3, in which mail data addressed to the CPU 1 and read out from the main server is stored, is retrieved, only the name of the sender and the subject in the mail data are read out and the data so read out is written as summary data of the electronic mail at a predetermined address in the display memory 7.

Figure 3:
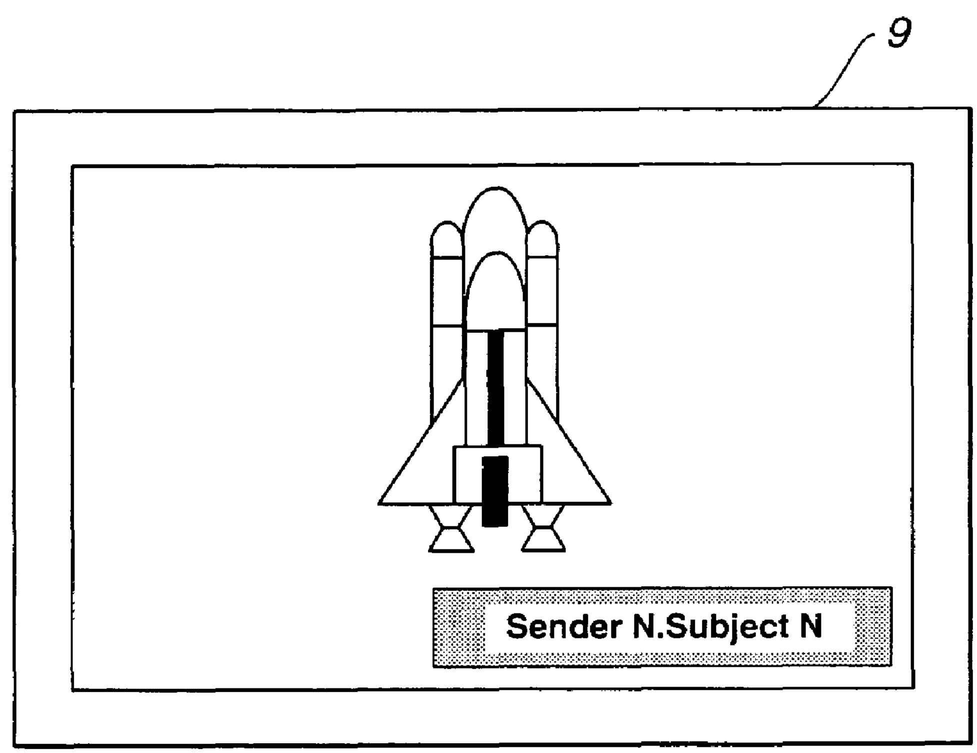
FIG. 3 is a schematic view showing the display state of the summary of the electronic mail on the television receiver of FIG. 1.

At the next step S6, the CPU 1 commands mail scroll on to the television receiving unit 6. This causes the television receiving unit 6 to read the sender's name and the subject sequentially to display them at a pre-determined position, for example, at the bottom, of the television picture by superimposition, as shown in FIG. 3. The television receiving unit 6 has, enclosed therein, readout control means which advances the readout address one dot each vertical synchronization period. The television receiving unit 6 superimposes the sender's names and the subjects on the bottom of the television picture, as it scrolls the sender's names and the subjects sequentially in the order of the sender's name 1+subject 1, sender's name 2+subject 2, . . . , sender's name N+subject N. This superimposes the electronic mail summary data on the bottom of a television picture on the display screen of the display unit 9 by way of performing scroll display.

Thus, the viewer of the television broadcast can be informed of the summary of the electronic mail being received as he or she is seeing the television broadcast.

Although the scroll display is made by the hardware provided on the television receiving unit 6, it is also possible to perform scroll display by a software technique as the contents of the display memory 7 are changed sequentially.

At the next step S7, it is checked whether or not an electronic mail check end command has been inputted by the keyboard 5. If the result of check at this step S7 is YES, the CPU 1 advances to step S8 to command the television receiving unit 6 to turn off the scroll display to terminate the electronic mail check processing. If the result of check at this step S7 is NO, that is if the electronic mail check end command has not been inputted, the CPU 1 advances to step S9.

At step S9, the CPU 1 checks whether or not a command for displaying the electronic mail on the full screen has been inputted by the keyboard 5. If the result of decision at this step S9 is NO, the CPU 1 returns to step S6 to continue the scroll display of the summary data at this step S9. If the result of decision at this step S9 is YES, that is if the command for displaying the electronic mail on the full screen has been inputted, the CPU 1 advances to step S10.

If, at the time point when the full-screen display command has been inputted, the electronic mail the summary of which has been scroll-displayed on the display screen of the display unit 9, such as the sender's name N+Subject N, the CPU 1 reads out the text of the electronic mail corresponding to the number N from the working RAM 3 at step S10 to write the red-out electronic mail text on the display memory 7.

Figure 4:
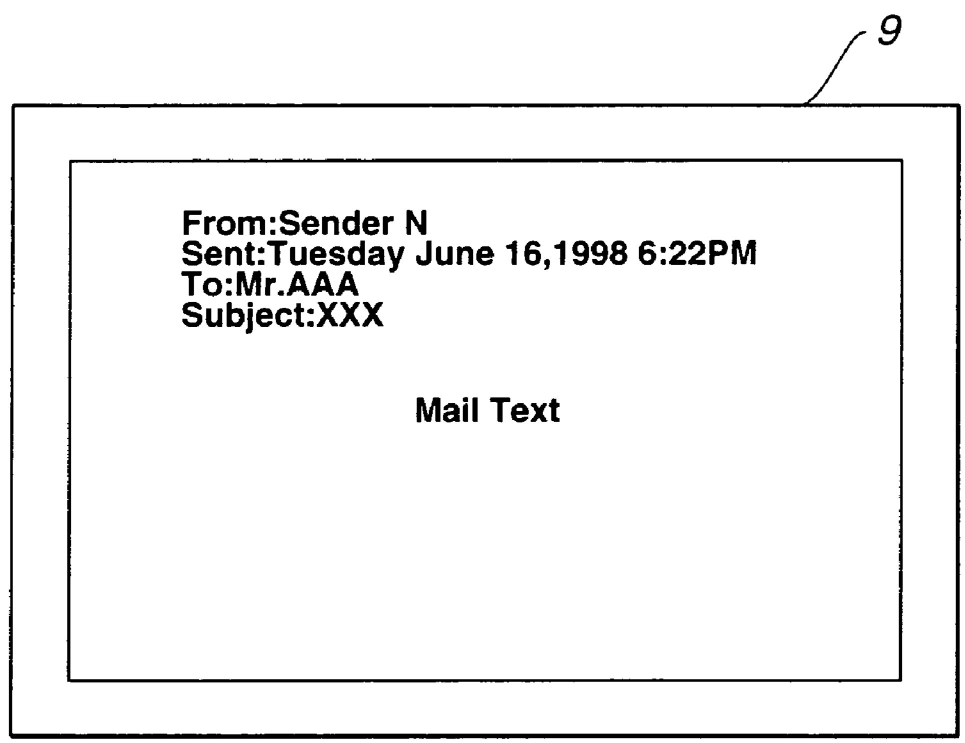
FIG. 4 is a schematic view showing the electronic mail display state on the entire screen of the television receiver of FIG. 1.

At the next step S11, the CPU 1 commands the television receiving unit 6 to display the mail on the entire screen. This switches the television receiving unit 6 from the mail scroll display-on state to the full screen mail display-on state so that the television receiving unit 6 reads out the electronic mail text written in the display memory 7 from its leading edge to display the read-out electronic mail text along with the name of the sender, subject or date on the entire display screen of the display unit 9, as shown in FIG. 4. Meanwhile, the display contents may be displayed on the entire television screen without superimposition, or displayed as multiple pictures.

At the next step S12, it is checked whether or not the full screen dispay end command has beeen inputted from the keyboard 5. If the result of decision at this step S12 is NO, that is if the end command for the full screen display of the electronic mail has not been inputted, the CPU 1 returns to step S11 to continue full screen display of the electronic mail. If the result of check at this step S12 is YES, the CPU 1 returns to step S6 to command scroll display-on to the television receiving unit 6 to perform scroll display of the sumary data for the electronic mail.

Specifically, the CPU 1 accepts the electronic mail check command to receive an electronic mail by the electronic mail function via modem 4 for connection to the external mail server and extracts the summary of the electronic mail by the summary extraction function to write the extracted summary on the display memory 7. By the superposing function of the television receiving unit 6, the CPU 1 superimposes the summary of the electronic mail on the television screen to display it on the display unit 9 along with the television picture. The CPU 1, accepting the full screen electronic mail display command, controls the superimposing function of the television receiving unit 6 so that the electronic mail received by the electronic mail function will be displayed on the entire screen of the display unit 9.

Thus, with the above-described television receiver, the viewer of television broadcast is able to grasp the summary of the electronic mail, as he or she views the television display, so that he or she can view the entire text only when he or she desires.

As for the access to the electronic mail, automatic access setting can be made at the outset, without it being necessary for the viewer to input an electronic mail check command by the keyboard 5. By setting this automatic access, the viewer can be apprised of the mail contents in much the same way as the routine news flash.

What is claimed is:

1. A television receiver comprising:

a connection interface for connection to an external mail server;

electronic mail means having an electronic mail function of sending and receiving electronic mail via said connection interface;

display means for displaying a television picture;

a random access memory;

a central processing unit for downloading a plurality of electronic mail from the mail server and storing the downloaded electronic mail in the random access memory;

a keyboard connected to the central processing unit for entering commands by a user;

a display memory, wherein the central processing unit reads out from the random access memory only the name of the sender and the subject of each of the electronic mail for storage in the display memory;

a television receiving unit for reading out data from the display memory and superimposing only the name of the sender and the subject of the electronic mail read out from said display memory at a predetermined position on a portion of the television picture displayed on said display means so that the television picture is not substantially obscured upon the entry of an electronic mail check command by the user of the keyboard, wherein said central processing unit controls an operation of said superimposing means, so that only information of the name of the sender and the title are horizontally scrolled for each successive electronic mail in said portion on said display means, and wherein said central processing unit controls an operation of said television receiving unit, so that upon entry of a full screen display command by the user of the keyboard, a text of the electronic mail is read out from said random access memory and is written into said display memory, thereby displaying the text of the electronic mail along with the information of the name of the sender and the title on the entire display screen of the display means.

2. The television receiver according to claim 1, wherein said central processing unit controls accepting an electronic mail check command to receive the electronic mail by said electronic mail means and to display the name of the sender and the title of the electronic mail along with the television picture on said display means.

3. The television receiver according to claim 1, wherein said central processing unit causes said electronic mail means to receive each new successive electronic mail and automatically to display in sequence the information of the name of the sender and the subject of each electronic mail superimposed on the portion of the television picture displayed on said display means.

* * * * *